United States Patent [19]

Takanashi et al.

[11] Patent Number: 4,786,897
[45] Date of Patent: Nov. 22, 1988

[54] DISPLAY SCREEN CONTROL METHOD

[75] Inventors: Katsuya Takanashi; Kimitoshi Yamada, both of Hatano, Japan

[73] Assignee: Hitachi, Ltd., Tokyo, Japan

[21] Appl. No.: 888,979

[22] Filed: Jul. 24, 1986

[30] Foreign Application Priority Data

Aug. 6, 1985 [JP] Japan ................................. 60-172984

[51] Int. Cl.$^4$ .............................................. G09G 1/00
[52] U.S. Cl. ..................................... 340/721; 340/706; 340/734
[58] Field of Search ............... 340/721, 723, 724, 731, 340/734, 706; 364/521

[56] References Cited

U.S. PATENT DOCUMENTS 4,366,475 12/1982 Kishi et al. ........................... 340/731
4,532,605 7/1985 Waller .................................. 340/731

Primary Examiner—Gerald L. Brigance
Assistant Examiner—Jeffery A. Brier
Attorney, Agent, or Firm—Antonelli, Terry & Wands

[57] ABSTRACT

A display screen control method for a display device capable of supporting a logical screen larger in size than its physical screen is provided. This method enables a desired area to be displayed on the display device by a single operation.

According to the method, a first rectangle similar to the logical screen is displayed on the physical screen, a second rectangle similar to the window area which was displayed within a view port in the physical screen is displayed in the first rectangle. The second rectangle is moved to a desired position within the first rectangle by a position indicating means such as a pointing device whereby the area the operator wishes to view is displayed in one quick operation.

1 Claim, 4 Drawing Sheets

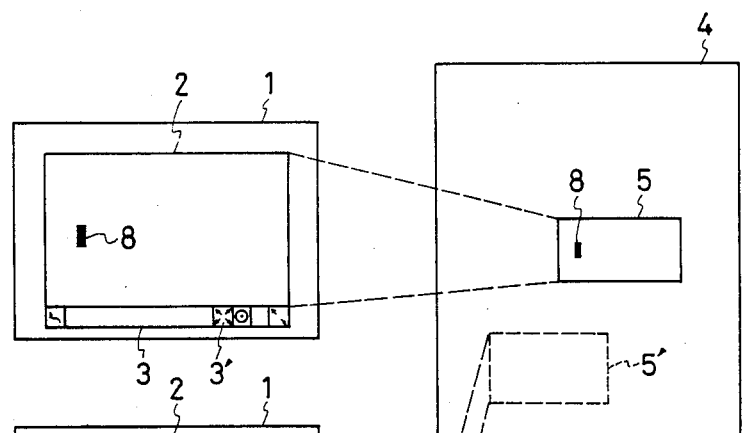
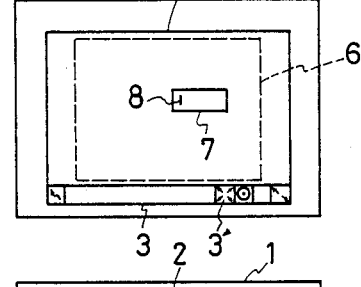
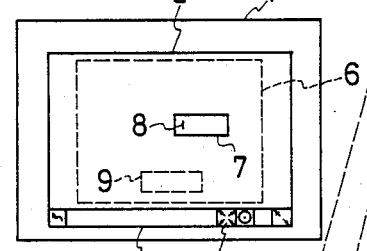
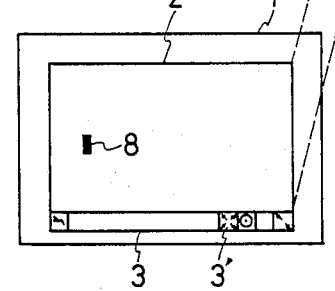
FIG. 1A
FIG. 1B
FIG. 1C
FIG. 1D

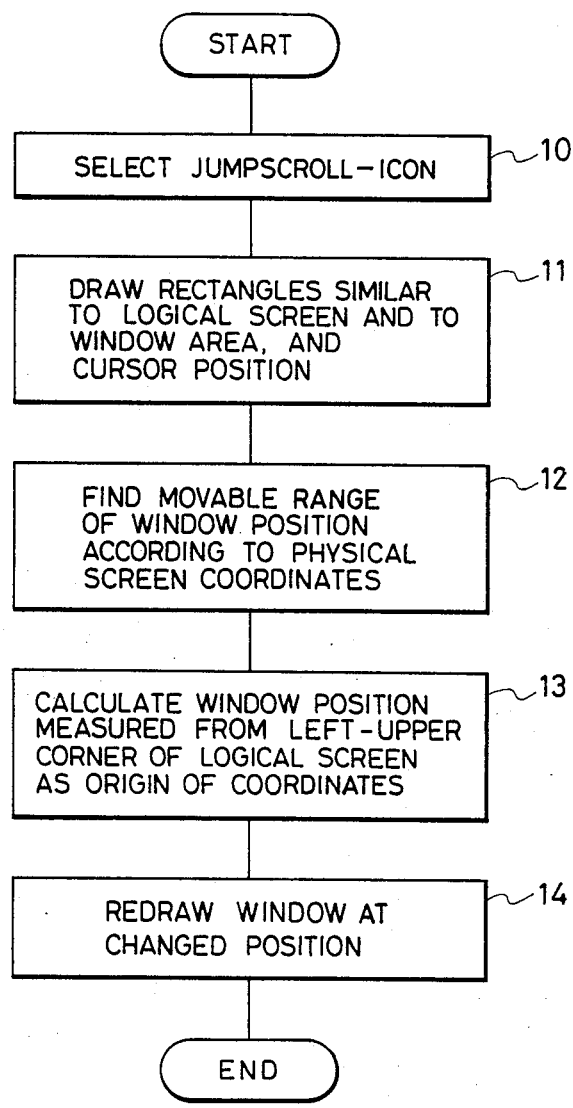

$$\frac{X'}{X} \leq \frac{Y'}{Y} \rightarrow X' \qquad Y' = \frac{X'Y}{X}$$

$$\frac{X'}{X} > \frac{Y'}{Y} \rightarrow Y' \qquad X' = \frac{Y'X}{Y}$$

DISPLAY SCREEN CONTROL METHOD

BACKGROUND OF THE INVENTION

This invention relates to a display screen control method and more particularly to a display screen control method for a display device having a logical screen larger in size than its physical screen.

In a display device having a logical screen larger in size than its physical one, the operator can not view the entire logical screen at a time. In such a case as this, a method has been adopted in which as described in the Japanese Patent Application Laid-open No. 55-78335, the range in which a part of the logical screen is displayed is continuously moved toward a desired direction until the required area on the logical screen appears. However, this method has had problems in that much time is required for moving the screen since the computer has to process a multiplicity of data and the load on the computer for indicating the display range at a target position becomes large.

SUMMARY OF THE INVENTION

An object of this invention is to provide a display screen control method which enables the operator to display by a quick operation the area he wishes to view by using a display device capable of supporting a logical screen larger in size than its physical screen.

This invention has the feature that a first rectangle similar in size to the logical screen is displayed on the physical screen, a second rectangle similar to the window area which was displayed in the physical screen for an operator's view is displayed in the first rectangle, and the second rectangle is moved to a desired position within the first rectangle by a position indicating means such as a pointing device whereby the area the operator wishes to view is displayed in one quick operation.

BRIEF DESCRIPTION OF THE DRAWINGS

FIGS. 1A-1D are diagrams illustrating the principle of this invention; FIG. 2 is a processing flow chart for realizing the principle illustrated in FIG. 1.

DETAILED DESCRIPTION OF PREFERRED EMBODIMENT

Figure 3A:
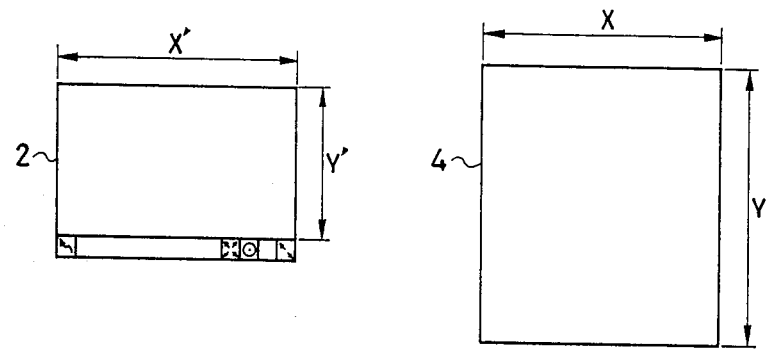
FIGS. 3A-3C and FIG. 4 are diagrams illustrating the principle for producing rectangles similar to a logical screen size and to the window area.

This invention will now be described in detail with reference to the accompanying drawings.

At the outset, the principle of this invention will be described by referring to FIG. 1A-1D which shows an example of the ordinary display screen. A window area 5 on a logical screen 4 designated by a cursor 8 is displayed in a view port 2 mapped on a physical screen 1. Reference numeral 3 designates an operation menu including a jumpscroll-icon 3' as one item thereof with respect to the display device. In case the operator wishes to view an area on the logical screen 4 different from that shown in FIG. 1A, the jumpscroll-icon 3' is selected by a pointing device (a position designating means) so as to give an instruction to change the display position and by this operation, the display screen changes to the state shown in FIG. 1B. That is, a rectangle 6 similar in size to the logical screen 4 is displayed within the view port 2 in the physical screen 1 and at the same time, an area 5 in the logical screen 4 appearing in the view port 2 on the existing physical screen 1 is displayed by a rectangle 7. In case the operator wishes to move the window area 5 on the logical screen 4 to a target position 5', the rectangle 7 on the physical screen 1 moves to a position 9 within the rectangle 6 as shown in FIG. 1C by moving the pointing device while watching the display screen. When the operation menu is selected by the pointing device in the state shown in FIG. 1C, a new window area 5' on the logical screen 4 is displayed in the view port 2 on the physical screen 1 as shown in FIG. 1D.

FIG. 2 is a processing flow chart for executing the operation illustrated by FIGS. 1A-1D. In case the operator wishes to affect the transfer from the area displayed in the view port 2 of the physical screen 1 to another area through a quick operation at one time, the jumpscroll-icon 3' may be selected by the pointing device (Step 10) whereupon the rectangles 6 and 7 which are similar to the logical screen 4 and to the window area 5, and the position of the cursor 8 are displayed (Step 11). Next, the movable range of the window position 9 is obtained from the coordinates of the physical screen (Step 12) so that the movement of the window position is limited to this range. When the operator operates the pointing device and then releases the selecting button of the pointing device, a new window position 9 having its original point of coordinates at the left-upper corner of the logical screen is calculated (Step 13) and the window position is changed and re-drawn on the basis of the calculated position (Step 14).

Figure 3B:
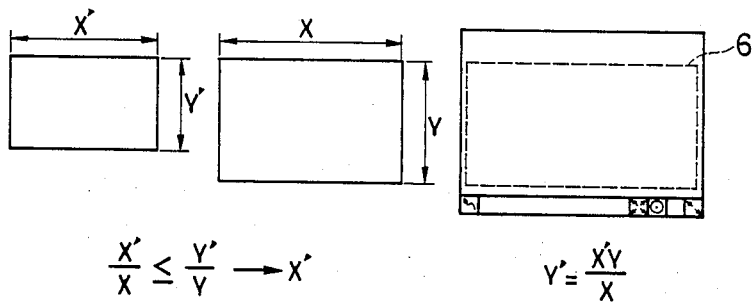
Figure 3C:
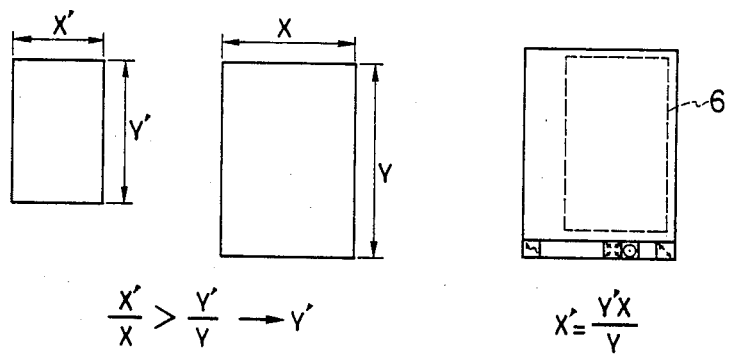

FIGS. 3A-3C illustrates a principle for drawing a rectangle similar to the logical screen within the view port in the physical screen. Assuming that the width and height of the view port 2 be X' and Y' while those of the logical screen be X and Y. When, in this case, the width ratio is smaller than the height ratio between the two, that is, the width of each of the view port and the screen is larger than the height thereof, the rectangle 6 similar to the logical screen 4 is obtained on the basis of the width X' of the view port 2. FIG. 3B shows an example of this case. On the contrary, when the relationship between the width and height is reversed, the similar rectangle 6 is obtained on the basis of the height Y' of the view port. FIG. 3C shows an example of this case.

Figure 4:
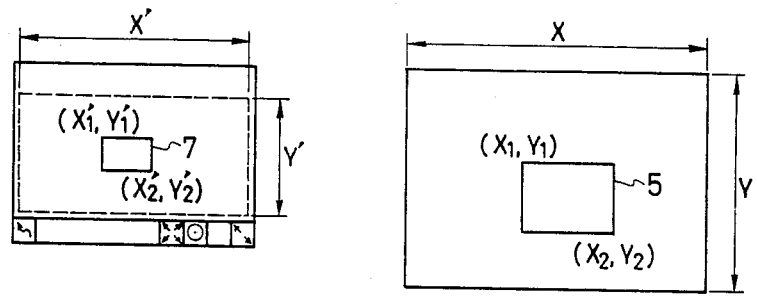

FIG. 4 illustrates a principle for drawing rectangles similar to the logical screen size and to the window area. This principle enables the operator to recognize at what position on the logical screen the area in the operator's sight is located. The coordinates (X1', Y1') and (X2', Y2') of the rectangle 7 with respect to the window area 5 in the logical screen can be obtained on the bases of the width and height ratios between the logical screen size and the view port size. That is, $$X_1' = \frac{X'(X_1 + 1) - X}{X} \quad X_2' = \frac{X'(X_2 + 1) - X}{X}$$

$$Y_1' = \frac{Y'(Y_1 + 1) - Y}{Y} \quad Y_2' = \frac{Y'(Y_2 + 1) - Y}{Y}$$

Figure 5:
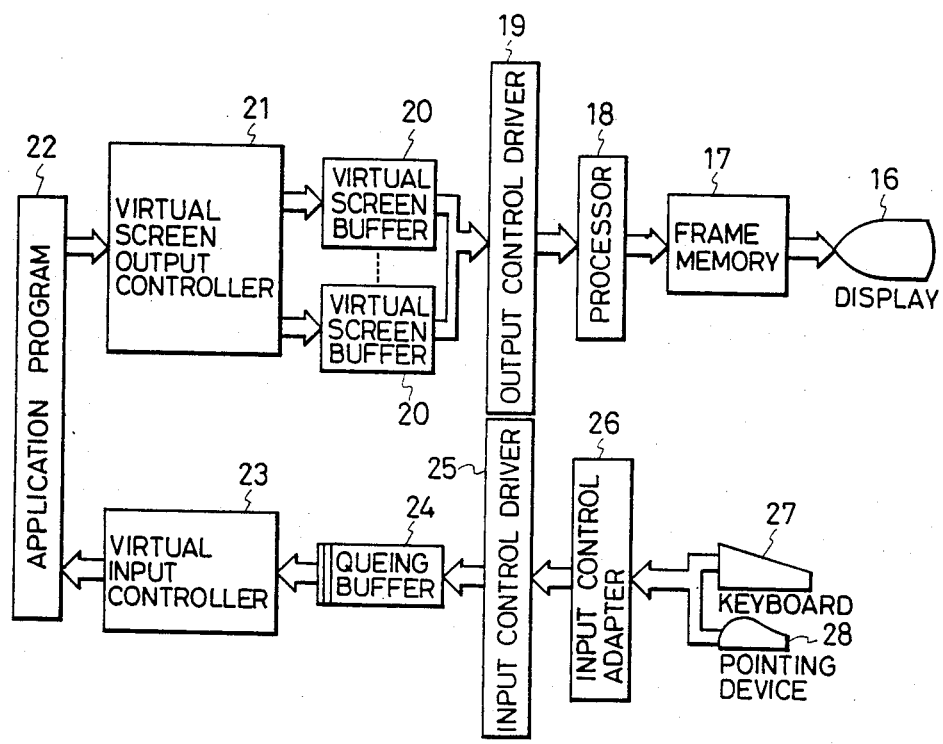
FIG. 5 is a block diagram showing an embodiment of a structure of a display device for performing a method according to this invention.

FIG. 5 shows an embodiment of a hardware structure of the display device for executing the method according to this invention. This display device is provided with a display 16 for displaying letters and designs, a frame memory 17 for storing data to be displayed on the display 16, a processor 18 for developing the letters and designs on the frame memory 17, a keyboard 27 as an inputting means by which the operator inputs data and commands, a pointing device 28 and an input control adapter 26 for controlling the inputting means. Instructions for outputting data such as letters and designs from an application program 22 are received by a virtual screen output controller 21 and stored by each of a plurality of virtual screen buffers 20. An output control driver 19 sends in sequence data stored by each of the virtual screen buffers 20 to the processor 18. Upon reception of an interrupt instruction from the input control adapter 26, an input control driver 25 receives input data and stores the data in an input data queing buffer 24. Upon reception of a data input demand instruction from the application program 22, the virtual input controller 23 takes out data from the input queing buffer 24 and passes the data to the application program 22.

Assuming that an ordinary display screen as shown in FIG. 1A is displayed when the menu area of the jumpscroll-icon 3' is selected by the pointing device 28, the input control adapter 26 reads the coordinate data. The coordinate data thus read is then passed to the input control driver 25 in response to an interrupt instruction from the input control driver 25 which in turn obtains a physical coordinate value and stores it in the input data queing buffer 24. When the storage of the physical coordinate value is complete, the above-mentioned virtual input controller 23 which is in a wait status is activated. The activated virtual input controller 23 distributes the data stored in the input queing buffer 24 among virtual terminals in accordance with its current activity (that is, to what virtual terminals the keyboard 27 and the pointing device 28 are effective). When the operation instructions distributed by the virtual input controller 23 are given to the respective virtual terminals, the virtual screen output controller 21 generates information for drawing the similar rectangles 6 and 7 on the screen under the support of the application program 22. This information generates on the bases of the logical screen size at the virtual terminal and the position within the logical screen size which is in the sight of the operator. The generated information for drawing is sent to the virtual screen buffers 20 corresponding to the virtual terminals and then to the bitmap processor 18 by an output control driver 19. Upon reception of a control instruction, the processor 18 writes the information for drawing in the frame memory 17 and causes it to be displayed on the display 16. This state is shown in FIG. 1B. Similarily, the rectangle 7 displayed on the display 16 is moved in such a manner that the pointing device 28 is moved, a physical coordinate value is obtained by reading the coordinate data from the pointing device 28 and the rectangle 7 is moved on the basis of the physical coordinate value. This state is shown in FIG. 1C.

Although the instant embodiment has been described in relation to a display device having a single window, it is also possible to apply it to a multi window display device by utilizing the operation of a jumpscroll used for the single window display device.

According to this invention, the display device for supporting a logical screen larger in size than its physical screen has such advantage that a target display position on the logical screen can be viewed by a single operation through the indication of a frame similar to the logical screen so that the number of developments of display can be reduced as compared to the conventional method of viewing a display device, by using a scroll operative continuously in both vertical and horizontal directions.

What is claimed is:

1. A display screen control method for facilitating the selection of display data in a display device capable of supporting a logical screen larger in size than a physical screen on which information of the logical screen is to be displayed, said method comprising the steps of:

displaying on the physical screen a first window area which is within the logical screen;

changing the display on the physical screen to a first rectangle related to the size of said logical screen in response to a command inputted by an operator, and displaying in the first rectangle displayed on the physical screen a second rectangle similar to said first window area which is within the logical screen and which was previously displayed on the physical screen just before displaying the first rectangle, the second rectangle being displayed in the first rectangle at a position corresponding to a position of the first window area in the logical screen;

moving the second rectangle to a desired position within said first rectangle so as to determine a second window area which is within the logical screen and which is desired to be picked up from the logical screen and to be displayed on the physical screen; and changing the display on the physical screen to the second window area determined by the second rectangle moved to the desired position in the first rectangle in response to another command inputted by the operator.

* * * * *